UNITED STATES PATENT OFFICE.

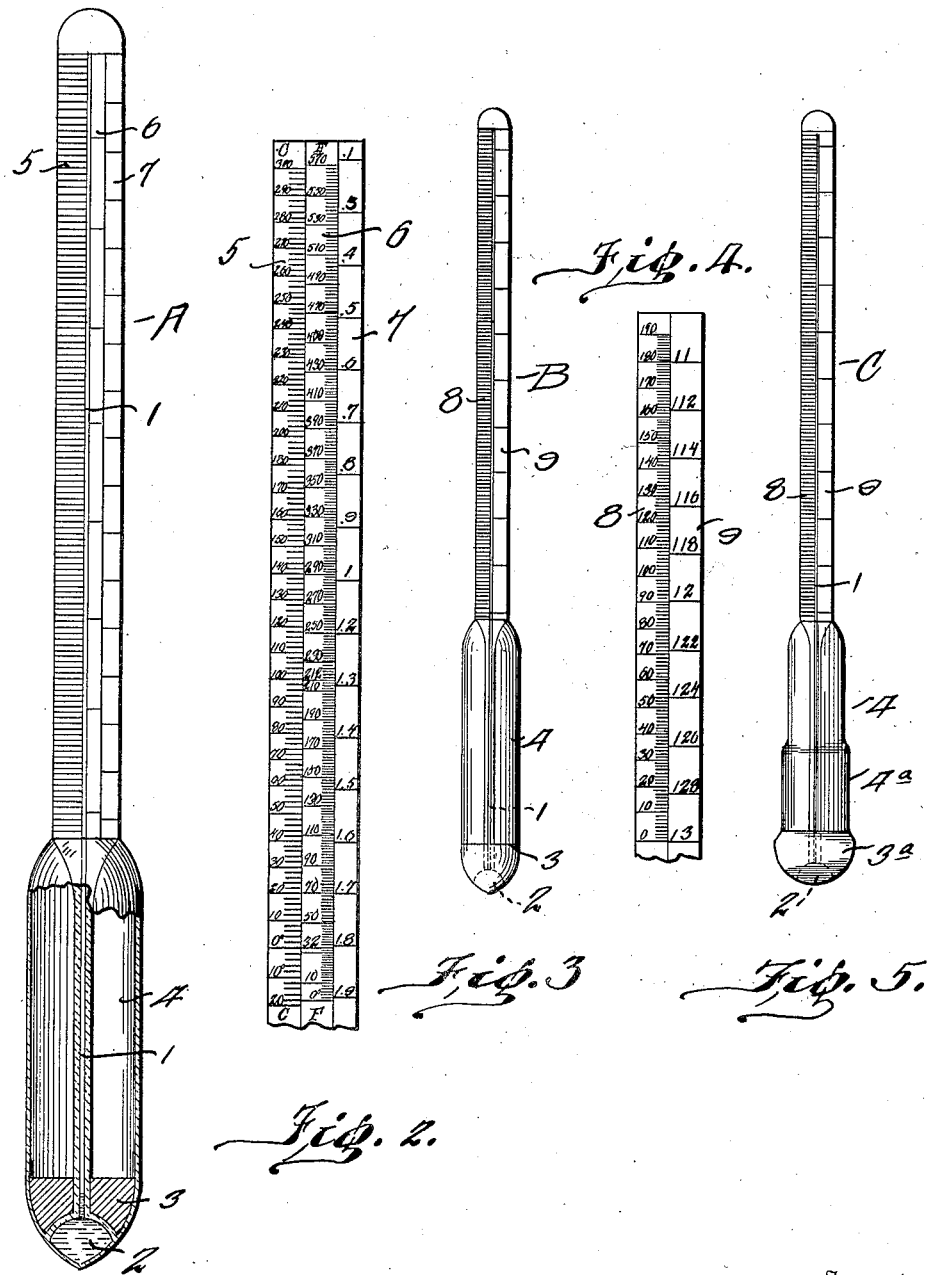

FRANK FLAIG, OF DANVILLE, KENTUCKY.

MEASURING INSTRUMENT.

1,407,851.  Specification of Letters Patent. Patented Feb. 28, 1922.

Application filed March 7, 1921. Serial No. 450,318.

*To all whom it may concern:*

Be it known that I, FRANK FLAIG, a citizen of the United States, residing at Danville, in the county of Boyle and State of Kentucky, have invented a new and useful Measuring Instrument, of which the following is a specification.

The object of my invention is to provide an instrument for obtaining all exact data to accurately calculate the correct specific gravity of any liquid at any temperature for practical industrial purposes; and to provide an instrument utilizing both Fahrenheit and centigrade scales. I attain these and other objects of my invention by the mechanism illustrated in the accompanying drawings, in which—

Figure 1 is an elevational view, partly in section, of the instrument;

Fig. 2 is an enlarged view of the scale markings, including both Fahrenheit and centigrade scales;

Fig. 3 is a view of a modified form of the invention;

Fig. 4 is an enlarged view of the scale markings on Fig. 3; and

Fig. 5 is an elevational view of a modified form of the invention.

Like characters of reference designate like parts throughout the several views.

Referring to the accompanying drawings, I provide a suitable thermometric instrument 1, having a float chamber 4, a weight 3 of lead or other suitable material in the bottom of chamber 4, and a mercury chamber 2 opening into tube 1. Referring to Figs. 1 and 2 I provide on the tube A the measurement markings 5 for a centigrade scale from 0 degrees to 300 degrees; and the measurement markings 6 of the corresponding Fahrenheit scale; and the measurement markings 7 of a specific gravity scale.

Referring to Figs. 3 and 4, the modified form of the invention shown is provided with measurement markings 8 of a Fahrenheit scale, and with measurement markings 9 of an adjacent specific gravity scale. In the modified form of the invention shown in Fig. 5, the float chamber 4 is provided with an enlarged portion $4^a$ and with the enlarged weight member $3^a$.

The principle involved in my invention is that of determining the exact gravity at any temperature, and to further determine what the correct reading of the specific gravity would be at another temperature, either Fahrenheit or centigrade, the idea being to obtain in one operation and with one instrument what ordinarily requires one or two operations with two instruments.

The scales illustrated in the accompanying drawings are merely illustrative of the invention generally. To produce the exact scale required, the following requirement should be observed: in the device illustrated in Figs. 3–5, which is for battery testing use only, the floats should be about 5 inches in length. The scale for liquids heavier than water should be about $2\frac{1}{16}$ of this length; the specific gravity column is divided into 30 equal spaces about $\frac{1}{16}$ inch each; and the thermometer scale is divided into 60 degrees, $\frac{1}{32}$ inch each, for the Fahrenheit scale, which should read from 60 degrees to 120 degrees. Each ten spaces on each column should be numbered.

In the larger form of the instrument, illustrated in Figs. 1–2, for liquids both lighter and heavier than water, both Fahrenheit and centigrade scales are provided, and a specific gravity scale, the latter reading 1.000 to 2.000 for liquids lighter than water. The object is to make the device suitable for oil testing, in which art there are compounds coming over at very low temperatures in the early stages of distillation which have a very low gravity reading, as, for example, .450 specific gravity. The Fahrenheit scale 6 in center should read from 0 degrees to 400 degrees; and the centigrade scale 5 should read from 0 degrees to the corresponding number of degrees on the centigrade scale—around 350 or 400 degrees. The scales must be based upon definite data to the extent that the mercury tube in the thermometer must be marked farther down the float than the specific gravity scale.

To determine the proper markings I weigh any standard float and measure its length, and then, according to the total length of the small upper part, lay off the scale. The weight 3 (or $3^a$) is necessary to insure the float standing upright at the lowest gravity mark. The lowest gravity mark must be high enough in the neck of the instrument so that the tube with the mercury at 120 degrees would not topple over in a solution at 1.300 specific gravity. The upper neck is approximately 3 inches long, and the spacing may be calculated on the ratio of the distance on the neck between an acid solution at 1.100 specific gravity, 60 degrees Fahrenheit, and 1.400 specific gravity, 60 degrees Fahrenheit.

The thermometer spacing may be determined by calibrating a capillary glass tube (about 1 circular mil internal cross section) attached to bulb containing mercury sufficient to rise to top of bulb at 120 degrees Fahrenheit. The lower temperature of 60 degrees is determined in the same manner by comparing with a standard thermometer at 60 degrees measured intervening distance, and calibrating into 60 degrees spaces.

The larger float is based on the same principle, with the exception that the scale is figured in each direction for the specific gravity of pure water, which equals 1.000 in center. The centigrade scale is calculated for distance on the following basis: Take the final Fahrenheit scale reading, and mulliply it by 5/9, and subtract 32, which would give the highest 0, degrees reading equals to highest Fahrenheit degree reading. 0 degree centigrade equals 32 degrees Fahrenheit, so that centigrade degrees scale would be the distance of final reading and freezing point, which should be laid off into equal parts to indicate the measurement or scale markings. The centigrade scale should be determined first, and the scale should read from 0 degree to 400 degrees, which would put the Fahrenheit scale at (400 plus 32) $\times 9/5$ equals $\frac{432 \times 9}{5}$ equals 3888 equals 777.6 degrees, or from 32 degrees Fahrenheit to 777.6 degrees Fahrenheit, the purpose of all of which is to secure an exact scale in making the instrument.

For instruments with temperatures high enough to break glass upon sudden immersion, suitably heavy glass or some other non-breakable substance must be used, and it is within the contemplation of my invention to use any appropriate material for the purpose.

What I claim is:

A measuring instrument for simultaneously determining temperatures and specific gravities, consisting of a thermometric float having a mercury chamber and longitudinally extending tube opening out of said chamber, the aforesaid tube having measurement markings of a Fahrenheit scale, an adjacent centigrade scale, and an adjacent specific gravity scale, the aforesaid scales being suitably positioned for permitting of simultaneous readings, and a suitable weight in the bottom of the float chamber, substantially as and for the purposes described.

FRANK FLAIG.